UNITED STATES PATENT OFFICE.

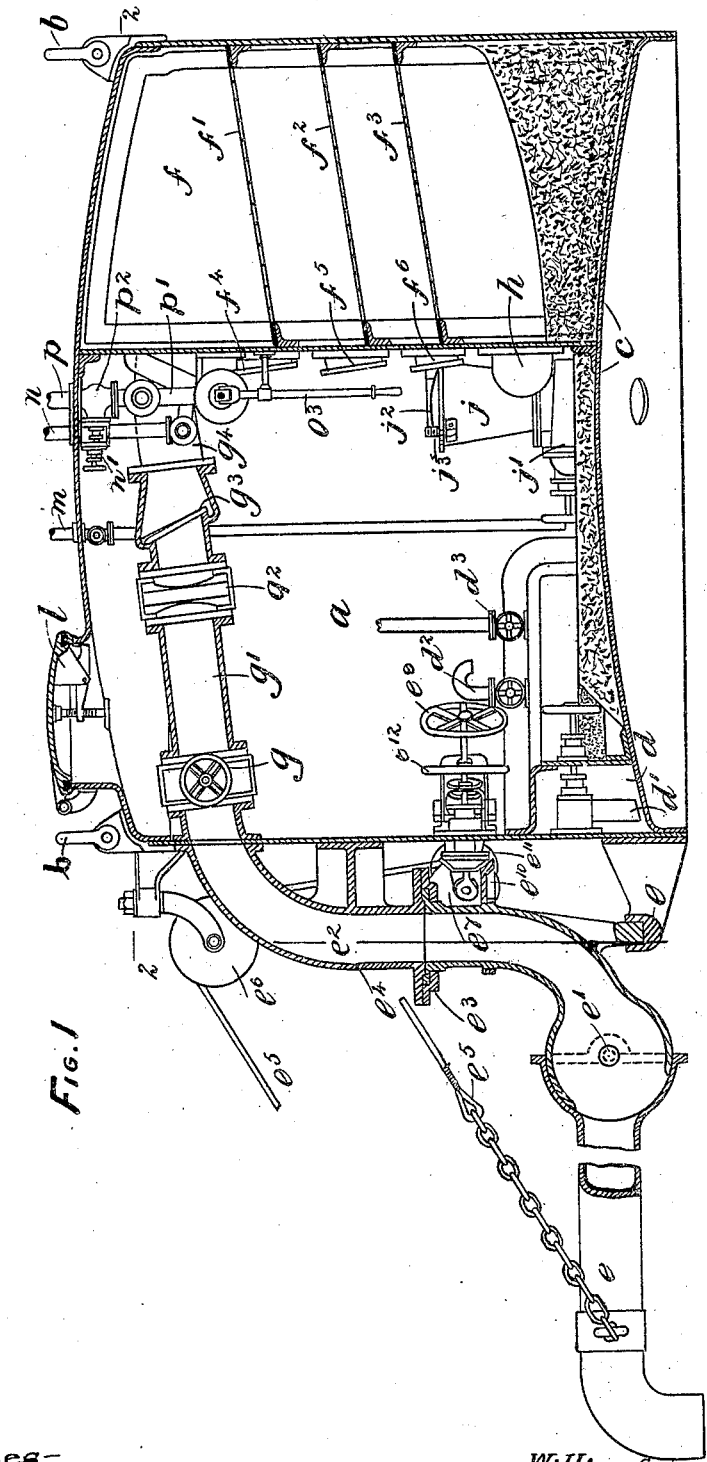

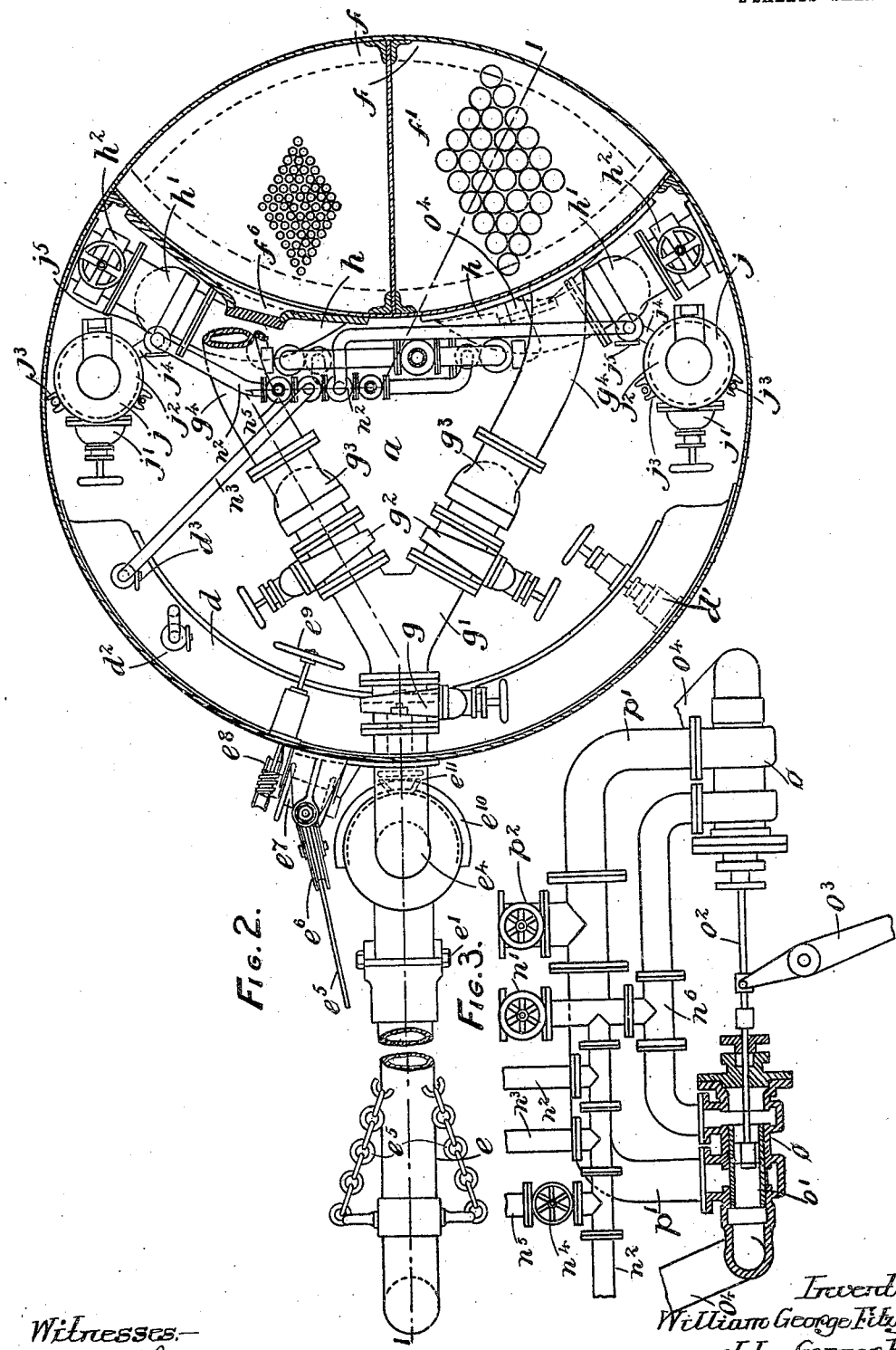

WILLIAM GEORGE FITZGERALD, OF WEST EALING, AND JOHN GARNAR FLOOD, OF WESTCLIFFE-ON-SEA, ENGLAND.

SUBMARINE DEVICE FOR DREDGING AND OTHER SIMILAR PURPOSES.

958,615.     Specification of Letters Patent.     Patented May 17, 1910.

Application filed December 14, 1909. Serial No. 533,011.

*To all whom it may concern:*

Be it known that we, WILLIAM GEORGE FITZGERALD and JOHN GARNAR FLOOD, both engineers, and subjects of the King of Great Britain and Ireland, and residents, respectively, of West Ealing, in the county of Middlesex, England, and Westcliffe-on-Sea, in the county of Essex, England, have invented new and useful Improvements in Submarine Devices for Dredging and other Similar Purposes, of which the following is a specification.

This invention relates to submarine devices for dredging and other similar purposes and has for its object the construction and arrangement of apparatus by which dredging and other similar operations can be carried out by men, contained within the apparatus and working under ordinary atmospheric pressure, means being provided whereby a sorting process can be carried on continuously within the device so that the valuable material can be collected in the apparatus and the refuse material can be discharged from the device whereby operations can be conducted over an extended period of time and over a considerable area of sea bed without any necessity for raising the material to the surface or bringing the apparatus to the surface except for change of men.

We attain these objects by the apparatus illustrated in the accompanying drawings, in which:—

Figure 1 is a sectional elevation of the apparatus taken on the line 1—1 of Fig. 2. Fig. 2 is a sectional plan of the apparatus taken on the line 2—2 of Fig. 1. Fig. 3 is a detail view of the control valve gear and pipe connections for the sorting chambers.

To carry the invention into effect we make a strong water-tight chamber $a$ which is adapted to be suspended by shackles $b$ from any suitable support at the surface of the water, for example, a barge. This chamber is provided with a suitable permanent ballast $c$ of such a weight as to cause the chamber to sink to the required depth.

In addition to the permanent ballast $c$ a water ballast tank $d$ is arranged around part of the lower portion of the chamber and is provided with a valve $d^1$, air vent valve $d^2$ and a compressed air supply valve $d^3$, this can be used for giving the chamber buoyancy by discharging the water ballast; thus causing the chamber to float in the event of the operators in the chamber getting no response to their signals from those at the surface of the water. Outside the chamber a suction or dredge pipe $e$ is arranged which may be telescopic or variable, both as to lateral extension for increasing its radius of action, and as to downward extension so as to vary the distance from the orifice of the pipe to the bed of the sea or the like.

In the device illustrated the pipe $e$ has a movement in a vertical plane about the pivot $e^1$ and a movement in a horizontal plane about the axis $e^2$, suitable packing means being provided at $e^3$ to form a joint where the movable pipe swivels, relative to the stationary pipe $e^4$. The pipe $e$ is supported by a chain or guy $e^5$ passing over a pulley $e^6$ on to a drum $e^7$, the latter being operated by worm and worm wheel gearing $e^8$ by an internal hand wheel $e^9$. The movement about the vertical axis is effected by a bevel wheel quadrant $e^{10}$ geared to a bevel wheel $e^{11}$ operated by an internal wheel $e^{12}$.

Within the chamber $a$ compartments $f$ are arranged, each compartment is divided into separate chambers vertically with perforated divided plates $f^1$, $f^2$, $f^3$; the perforations of each plate varying in size, the upper plate having the largest perforations and the lowest plate the smallest perforations. These plates slant slightly toward the center of the chamber and where they meet the wall of the compartment $f$, water-tight doors $f^4$, $f^5$, $f^6$, are arranged so as to allow access to each compartment separately. The pipe $e^4$ after passing through the wall of the chamber $a$ has a main sluice valve $g$ attached to it, from which a bifurcated pipe $g^1$ having sluice valves $g^2$ and non-return flap valves $g^3$ communicates to each chamber $f$ by the pipes $g^4$. At the lower part of each chamber $f$ a discharge pipe $h$ is disposed having a non-return valve $h^1$ and sluice valve $h^2$, the latter being connected to the wall of the chamber $a$ so as to communicate with the exterior in order to discharge from the compartment the liquid and solid material which has passed through the various perforated plates.

On the floor of the chamber $a$, discharge hoppers $j$ are mounted each having a sluice valve $j^1$ and hermetically closed hinged lid $j^2$ provided with tightening bolts $j^3$. A supply of compressed air brought by piping from the surface is admitted to the hopper $j$ through a pipe $j^4$ and controlled by a valve $j^5$ in each case. If necessary discharge chutes may be arranged from the water tight doors $f^4$, $f^5$ and $f^6$ to the discharge hoppers $j$ for conveying the material removed from the perforated plates for discharge to the exterior of the apparatus.

On the roof of the chamber $a$ is arranged a manhole door $l$ which can be hermetically closed and also the vent pipe and valve $m$ for allowing the discharge of vitiated atmosphere, the pipe $m$ being led above the surface of the water.

From any convenient source of compressed fresh air at the surface, the supply is led to the chamber $a$ through the pipe $n$ and valve $n^1$ and is fed by the pipes $n^2$ to the discharge hoppers $j$, the pipe $n^3$ to the ballast tank $d$ and by the valve $n^4$ and pipe $n^5$ for replenishing the air in the chamber $a$. There is a further pipe connection $n^6$ leading to the control valves $o$ for carrying out the necessary operations in the chambers $f$, each control valve $o$ is of similar construction and consists of a sleeve valve $o^1$ which opens and closes alternatively connection with the compressed air supply, fed from the pipe $n^6$, also communication with the air vent pipe $p$ through the pipe $p^1$ and valve $p^2$. The pipes $p^1$ from each distributing valve are joined, the valve $p^2$ being common to both. The valves $o^1$ are connected together by a common operating rod $o^2$ adapted to be operated by a lever $o^3$. Each control valve $o$ is connected by a pipe $o^4$ to its respective chamber $f$.

The operation of the device is as follows:—When the chamber $a$ has been lowered into a suitable position on or near the sea bottom, the valves $g$, $g^2$ and $h^2$ are opened, the valves $o^1$ being in the center or shut position, and the outer end of the pipe $e$ is brought into proximity with the bed of the sea by means of the wheel $e^9$, it being understood that said pipe is connected to any suitable suction device (not shown). When all is ready for operation the lever $o^3$ is adjusted so as to place the particular control valve $o^1$ in the position opposite to that shown in Fig. 3, so that the chamber $f$ is connected with the vent pipe $p$ through the pipe $o^4$, valve $o^1$, pipe $p^1$ and valve $p^2$. The head of water opens the non return valve $g^3$ and the water flows rapidly into the particular compartment $f$, while at the same time the head of water closes the non-return valve $h^1$. The pipe $e$ is then moved as may be desirable horizontally by means of the hand wheel $e^{12}$ so that the flow of water carries up solid material with it and deposits said solid material upon the upper plate $f^1$.

The material of various sizes is retained by or passes through the perforated plates of varying mesh so as to be retained by each respective plate according to size. When the compartment $f$ is full the lever $o^3$ is moved so as to put the valve $o^1$ into the position shown in Fig. 3 in which case the communication is cut off from the vent pipe $p$ and communication is made to the pressure pipe $n$. The pressure in the chamber $f$ then opens the non-return valve $h^1$, and closes $g^3$, forces the water out of the chamber $f$ and leaves the perforated plates with the solid material thereon free from water. The water tight doors $f^4$, $f^5$, $f^6$, of the particular compartment $f$ can now be opened, the corresponding valve $g^2$ being closed, and the solid residue be removed in each case. The valuable material is then collected from the bulk, and stored within the chamber while the residue is fed into one of the discharge hoppers $j$. When the said hopper is filled the lid $j$ is hermetically closed and the valve $j^1$ is opened and compressed air is delivered to the hopper $j$ through the pipe $j^4$ and the valve $j^5$ whereby the contents of the hopper are delivered into the external water. After such discharge when the hopper is full of air the valves $j^1$ and $j^5$ are closed, so that when the lid $j^2$ is opened the hopper is empty and ready for a further charge of material. It will be seen that by arranging the chambers $f$ in pairs a continuous operation can be effected, as while one chamber $f$ is being filled the other chamber $f$ can be emptied.

During the operation of the machine the surface boat or barge can be gradually moved along so as to treat fresh ground. The operators in the chamber $a$ are under ordinary atmospheric pressure, the supply of fresh air being adjustably controlled through the valve $n^4$ and pipe $n^5$.

The valves $g$, $h^2$ and $h^2$ are it will be noticed not necessarily used in the manipulation of the apparatus, but are mainly provided as a safe-guard against the entry of water into the chamber $a$, should any part of the feeding, separating and discharging system be out of order or damaged. Also when the lever $o^3$ is in the central position both vent and pressure connections are cut off.

What we claim as our invention and desire to secure by Letters Patent is:—

1. A submarine device for dredging and similar purposes comprising a closed chamber, closed compartment in said chamber, a movable dredge pipe mounted outside said chamber, internal means for operating said pipe, controllable means for connecting said compartment with said dredge pipe, controllable means for discharging liquid contents from said compartments, controllable means for supplying compressed air to said compartment and means for maintaining a life sustaining atmosphere in said chamber, substantially as set forth.

2. In a dredging device comprising a closed chamber and a closed compartment within the same the combination with said compartment of a discharge apparatus with inlet and outlet control devices and controllable means for admitting a supply of compressed air thereto for emptying the discharge apparatus of solid and liquid contents, substantially as set forth.

3. In a dredging device comprising a closed chamber and a closed compartment within the same, the arrangement of a series of perforated partitions dividing the compartment, each division provided with a water-tight access door, and co-acting controlling means for alternately charging and discharging the compartments by the operation of said controlling means, substantially as set forth.

4. In a dredging device comprising a closed chamber, a closed compartment within said chamber and a dredge pipe discharging into said compartment, mechanism operated from the interior of said chamber for varying the position of the inlet orifice of the dredge pipe relative to the sea bottom in combination with means also operated internally for giving the said dredge pipe an oscillatory motion so as to systematically treat any given area, substantially as set forth.

5. In a dredging device comprising a closed chamber, closed compartments within said chamber and a movable dredge pipe, a bifurcated pipe fitted with sluice and check valves connected to the dredge pipe and discharging into the closed compartments substantially as set forth.

6. In a dredging device comprising a closed chamber closed compartments within said chamber and a dredge pipe, means for moving said dredge pipe comprising the chain $e^5$, the pulley $e^6$, the drum $e^7$, the worm gearing $e^8$ actuated by the hand wheel $e^9$ in combination with the bevel wheel quadrant $e^{10}$, bevel wheel $e^{11}$ and hand-wheel $e^{12}$ substantially as set forth.

7. In a dredging device comprising a closed chamber, closed compartments within said chamber and a dredge pipe, means for discharging the liquid contents from said compartments comprising duplex piston valves controlling the supply of compressed air to said compartments substantially as set forth.

8. In a dredging device comprising a closed chamber, closed compartments within said chamber and a dredge pipe, permanent ballast within said chamber in combination with a water ballast tank fitted with blow off valves, and a valve connected with the compressed air supply substantially as set forth.

9. In a dredging device comprising a closed chamber, closed compartments in said chamber and a dredge pipe, the combination of the discharge hoppers $j$ fitted with air tight covers $j^2$, and the pipes $h$, check valves $h^1$ and closing valves $h^2$ substantially as set forth.

In testimony whereof we have signed our names to this specification, in the presence of two subscribing witnesses.

WILLIAM GEORGE FITZGERALD.
JOHN GARNAR FLOOD.

Witnesses as to William George Fitzgerald:
R. C. THOMSON,
Y. BENNIE BROWNLIE.

Witnesses as to John Garnar Flood:
R. WESTACOTT,
CARL R. LOOP.